May 5, 1931.  I. D. RICHHEIMER  1,803,356
PERCOLATOR
Filed July 20, 1929
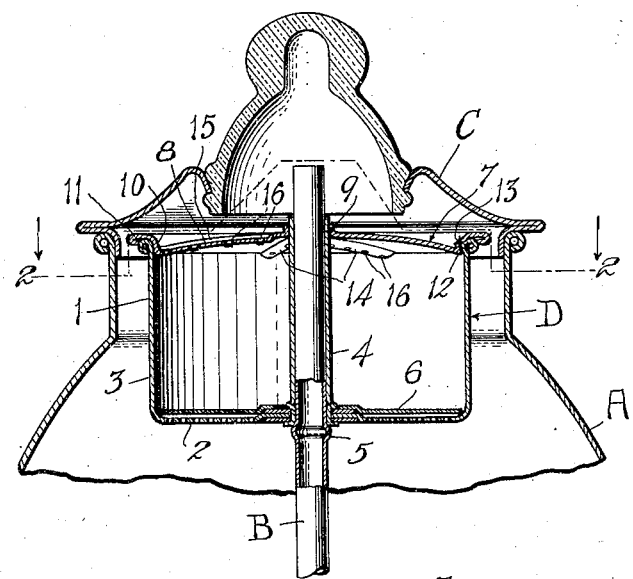
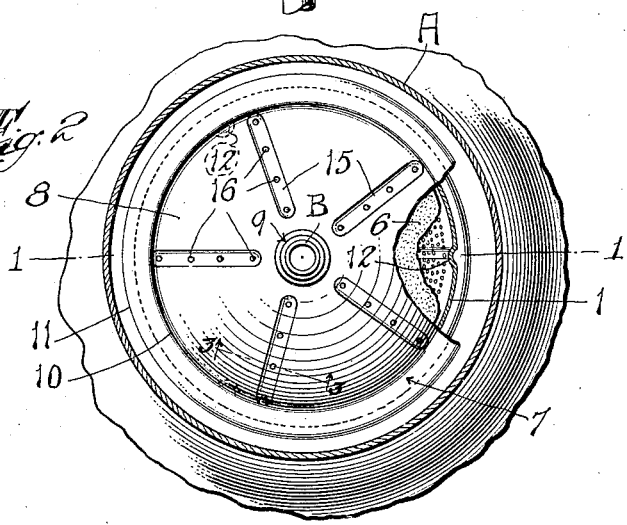
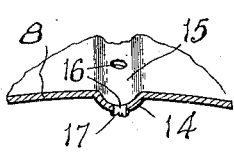
INVENTOR
Isaac D. Richheimer,
BY
ATTORNEYS.

Patented May 5, 1931

1,803,356

UNITED STATES PATENT OFFICE

ISAAC D. RICHHEIMER, OF NEW YORK, N. Y.

PERCOLATOR

Application filed July 20, 1929. Serial No. 379,654.

This invention relates in general to percolators, and more particularly to the drip cup utilized in percolators for containing the ground coffee.

One object of my invention is to provide a drip cup embodying novel and improved construction whereby the possibility of coffee grounds passing out of the cup into the liquid coffee is greatly reduced.

Another object is to provide a drip cup having a perforate bottom and a perforate top, water spreader plate or coffee strainer, with a filter medium such as filter paper covering the perforations in the bottom so as to positively prevent solid particles of coffee from passing through said perforations, said top being constructed so as to provide a slow flow of water through the drip cup in accordance with the flow of the liquid coffee through the filter medium.

A further object is to provide such a drip cup in which the cover or spreader plate is constructed to restrict the upward rising of coffee grounds therethrough should the flow of water through the filter medium become restricted, and to prevent any solid particles which might pass upwardly through the perforations in the top from falling off the top into the liquid coffee below the drip cup without restricting overflow of water from said cup.

Other objects are to provide a drip cup of the character described wherein the coffee retainer has the perforations so formed as to retard or prevent solid particles from passing upwardly therethrough from the cup; to provide such a drip cup the top of which is convexly curved and has an annular imperforate gutter-like groove at its outer edge whereby all solid particles will fall by gravity into said annular groove and the water may slowly flow through the perforations and overflow over the edges of the cover without carrying solid particles with it; to provide a drip cup having the top or cover positively fastened thereon; and to obtain other advantages and results as will be more fully brought out by the following description.

Referring to the accompanying drawing in which corresponding and like parts are designated by the same reference characters, Figure 1 is a central vertical sectional view of the upper part of a percolator embodying my invention taken on the line 1—1 of Figure 2.

Figure 2 is a horizontal sectional view taken on the line 2—2 of Figure 1, and

Figure 3 is an enlarged fragmentary transverse sectional view taken on the line 3—3 of Figure 2.

Specifically describing the illustrated embodiment of the invention, the reference character A designates the upper portion of a percolator vessel or pot centrally through which extends a percolator tube B of known construction through which the liquid is forced upwardly by known devices for that purpose. The top of the vessel A is closed by a removable cover C. The drip cup D embodying my invention comprises a cup-like casing 1 having a perforated bottom 2 and imperforate side walls 3. This drip cup may be removably mounted upon the percolator tube or fixedly attached thereto, but in the present instance I have shown the cup removably mounted upon the percolator tube and having projecting upwardly centrally from its bottom, a tube 4 which telescopically fits over the percolator tube and is held in proper elevated position thereon by engagement with an enlargement or other abutment 5 on the percolator tube. The perforated bottom 2 of the drip cup is covered by a filter medium 6, such as a sheet of filter paper.

The top of the drip cup has mounted thereon a coffee retainer or cover or water spreader 7, the purpose of which is to prevent the ground coffee from rising upwardly out of the cup and also to spread the water which falls upon it from the upper end of the percolator tube so that the water is distributed over a large surface in the cup. This coffee retainer is preferably formed of sheet metal and comprises a central concavo-convex portion 8 through the center of which is an opening 9 to fit over the upper end of the tube 4. At the edges of the concavo-convex central portion 8 is an upturned flange 10 on the convex upper side, which preferably is of such height that the plane of the upper edge thereof is flush with or higher than the highest point in the concavo convex central portion 8. The diameter of the flange 10 is substantially equal to the internal diameter of the drip cup D so that said flange may fit into the open end of the drip cup, and preferably an annular peripheral flange 11 is provided at the upper edge of the upturned flange 10 to overlie the top edge of the drip cup and provide a hand hold for applying the coffee retainer to and removing it from the drip cup. For positively holding the coffee retainer upon the drip cup I may provide a plurality of projections 12 on the interior of the drip cup which enter correspondingly shaped and spaced recesses 13 on the outer side of the upturned flange 10. By forcibly pressing the coffee retainer into the drip cup, the projections 12 snap into the recesses 13 so as to hold the coffee retainer in position.

It is necessary that the coffee retainer 7 be perforated to permit water to flow therethrough into the coffee in the drip cup D, and in accordance with my invention, the coffee retainer is so formed that the solid particles of coffee are restricted from passing upwardly in the drip cup through the perforations in the retainer. For this purpose I have shown the retainer as provided with a plurality of transversely curved ribs 14 on its inner surface which may be formed by stamping the material of which the retainer is formed inwardly to form grooves 15 on the upper surface of the retainer. Preferably these grooves are arranged radially of the retainer, and they have naturally burred perforations 16 at their bottoms which pass through the top of the ribs 14 with the burred edges 17 on the inner side of the retainer, as clearly shown in Figure 3 of the drawing. As will be understood from the foregoing, the coffee retainer 7 is applied to the drip cup with the convex side uppermost and the water issuing from the percolator tube B falls upon the coffee retainer and passes through the perforations 16 into the coffee. Should the water flow through the perforations 16 faster than it passes through the filter medium 6 there will be a tendency for the coffee to rise upwardly through the perforations 16. However, the coffee grounds or solid particles are deflected away from the perforations 16 by the curved ribs 14, and furthermore the burred edges 17 tend to prevent the coffee grounds from entering the openings 16. Should any coffee grounds or solid particles reach the upper side of the coffee retainer, they will immediately flow by action of gravity over the convex surface into the annular gutter-like groove formed by the upturned flange 10 at the edge of the central portion 8. Here the solid particles will settle, and even should the water overflow over the upturned flange 10, the solid particles will remain in the groove and will thereby be prevented from falling into the liquid coffee in the bottom of the vessel A. Preferably the size and number of the openings 16 are such that their capacity is substantially equal to the water passing capacity of the filter medium 6, whereby tendency of the water to overflow from the cup D is restricted. The limiting of the number of perforations in the coffee retainer has the additional function of restricting the passage of coffee grounds upwardly through the retainer.

The use of filter medium insures an entirely clear liquid coffee because the filter medium positively prevents passage of any solid particles of coffee. With filter medium the perforations in the bottom 2 of the cup may be made larger to compensate for the infinite number of capillary passages through the filter medium. It is thus not necessary to perforate the sides of the drip cup, and this avoids the possibility of solid particles of coffee passing through the perforations in the sides of the cup.

While I have shown and described the invention as embodied in certain details of construction it will be understood that this is primarily for illustrating the principles of the invention and that many modifications and changes may be made in the details of construction without departing from the spirit or scope of the invention.

Having thus described my invention, what I claim is:

1. The combination of a percolator drip cup having a perforate bottom, a coffee retainer in said cup, and a percolator tube extending centrally through the cup and said retainer for delivering liquid upon the top of said retainer, said coffee retainer having a convex perforated top surface and an annular imperforate upwardly facing groove at its edges.

2. The combination of a percolator drip cup having a perforate bottom, a coffee retainer in said cup, a percolator tube extending upwardly centrally through the cup and said coffee retainer for delivering liquid upon the top of the latter, said coffee retainer having a central convex perforated top surface and an imperforate rim including an upturned flange forming an annular imperforate upwardly facing groove at the lower edge of said convex top surface.

3. A percolator drip cup having a perforate bottom, a coffee retainer on said cup having portions stamped to form radial grooves on the outer surface and corresponding ribs on the inner surface, and a plurality of perforations through said retainer at bottoms of said grooves.

4. A percolator drip cup having a perforate bottom, a coffee retainer on said cup having portions stamped to form grooves on the outer surface and corresponding ribs on the inner surface, and a plurality of naturally burred perforations through said retainer at the bottoms of said grooves with the burs on the inner side of the retainer at the tops of said ribs.

ISAAC D. RICHHEIMER.